(12) United States Patent
Decottignies

(10) Patent No.: US 6,268,707 B1
(45) Date of Patent: Jul. 31, 2001

(54) ELECTRIC CURRENT SUPPLY DEVICE FOR TRACTION ENGINES OF URBAN OR SUBURBAN VEHICLES

(75) Inventor: Pierre Decottignies, Neuville-en-Ferrain (FR)

(73) Assignee: Alstom France SA, Paris (FR)

( * ) Notice: Subject to any disclaimer, the term of this patent is extended or adjusted under 35 U.S.C. 154(b) by 0 days.

(21) Appl. No.: 09/384,596

(22) Filed: Aug. 27, 1999

(30) Foreign Application Priority Data

Aug. 28, 1998 (FR) .................................................. 98 10828

(51) Int. Cl.[7] ....................................................... H02P 1/54
(52) U.S. Cl. .............................. 318/65; 318/375; 318/376
(58) Field of Search .................................. 318/49, 51, 54, 318/65, 86, 87, 139, 826, 830, 831, 375, 376, 293

(56) References Cited

U.S. PATENT DOCUMENTS 5,170,105 * 12/1992 Kumar .................................. 318/375
5,331,261 * 7/1994 Brown .................................. 318/376

* cited by examiner

Primary Examiner—Khanh Dang
(74) Attorney, Agent, or Firm—Young & Thompson

(57) ABSTRACT

Device for supplying electric current to at least one series-excitation motor, characterized in that it includes a chopper comprising a midpoint (M) linked to the rotor of the motor and to which are connected at least one first controlled static switch which is additionally connected to a voltage source for applying a supply current in traction mode to the electric motor and at least one second controlled static switch, additionally linked to earth, for closing a circuit for linking with a load for the motor operating in generator mode during braking and reverse-biased diode-type changeover-switching means for respectively allowing the supply current of the motor delivered by the first controlled static switch to pass in a first direction while the latter is conducting, and for allowing the current delivered to the circuit for linking with the load by the motor operating in generator mode to pass in a second direction through the second controlled static switch when the latter is conducting.

7 Claims, 3 Drawing Sheets

ELECTRIC CURRENT SUPPLY DEVICE FOR TRACTION ENGINES OF URBAN OR SUBURBAN VEHICLES

BACKGROUND OF THE INVENTION

The present invention relates to electric-current supply devices for traction engines of urban or suburban vehicles, and applies more particularly to current-chopper devices.

In devices of this type, in order to make the electric motors operate either in traction or in braking mode, electromechanical switches such as contactors or static switches such as thyristors are used, the implementation of all these changeover-switching means requiring the use of forced-commutation circuits or, in the case of thyristor circuits, their control being subject to a wait for the current of the thyristors to fall below their hypostatic holding current.

In all cases there is a discontinuity of current, which constitutes a not inconsiderable drawback of the known devices.

The invention aims to create a device for supplying power to electric traction motors which are able to be switched between traction and braking, this device allowing traction-braking changeover switching of series-excitation motors in an entirely static and natural way.

Hence the subject of the invention is a device for supplying electric current to at least one series-excitation motor, characterized in that it includes a chopper comprising a midpoint linked to the rotor of the said motor and to which are connected at least one first controlled static switch which is additionally connected to a voltage source for applying a supply current to the electric motor in traction mode, and at least one second controlled static switch, additionally linked to earth, for closing a circuit for linking with a load for the motor operating in generator mode during braking and reverse-biased diode-type changeover-switching means for respectively allowing the supply current of the motor delivered by the first controlled static switch to pass in a first direction while the latter is conducting, and for allowing the current delivered to the circuit for linking with the load by the motor operating in generator mode to pass in a second direction through the said second controlled static switch when the latter is conducting.

The power supply device according to the invention may further include one or more of the following characteristics, taken in isolation or according to all technically possible combinations:

- the said first and second controlled static switches are switches formed by IGBT insulated-gate bipolar transistors,
- the common point of the chopper is connected to at least one series-excitation motor mounted in a first branch, including a rotor and a field coil of the said motor and the associated diode-type changeover-switching means and to at least one series-excitation motor mounted in a second branch connected in parallel with the first branch and comprising a rotor and a field coil of the said motor and the associated diode-type changeover-switching means, the load for the said motors operating in generator mode being common to the first and to the second branches,
- the diode-type changeover-switching means biased in a first direction comprise a first diode connected between the rotor and the associated field coil of the motor and a second diode connected between the said field coil and earth, the said first and second diodes being biased to conduct the supply current of the said motor delivered by the said first controlled static switch when it is conducting, the second controlled static switch being turned off,
- the changeover-switching means with diodes biased in a second direction comprise a third diode connected between the rotor and the associated field coil and a fourth diode interposed between the field coil and the load, the said third and fourth diodes being biased to conduct the braking current delivered by the motor operating in generator mode when the second controlled static switch is conducting, the first controlled static switch being turned off,
- the changeover-switching means with diodes biased in a second direction comprise a third diode connected between the rotor of the motor arranged in the said first branch and the field coil of the motor arranged in the said second branch, and a fourth diode interposed between the field coil and the load (40), the said third and fourth diodes being biased to conduct the braking current delivered by the motor operating in generator mode when the second controlled static switch is conducting, the first controlled static switch being turned off,
- the chopper includes, connected to its midpoint, several first controlled static switches for applying the power supply current to the said at least one electric motor in traction mode, and the same number of second controlled static switches for closing the circuit for linking with the load for the motor operating in generator mode during braking.

BRIEF DESCRIPTION OF THE SEVERAL VIEWS OF THE DRAWINGS

The invention will be better understood with the aid of the description which will follow, given solely by way of example and by referring to the attached drawings, in which.

DETAILED DESCRIPTION TO THE INVENTION

Figure 1:
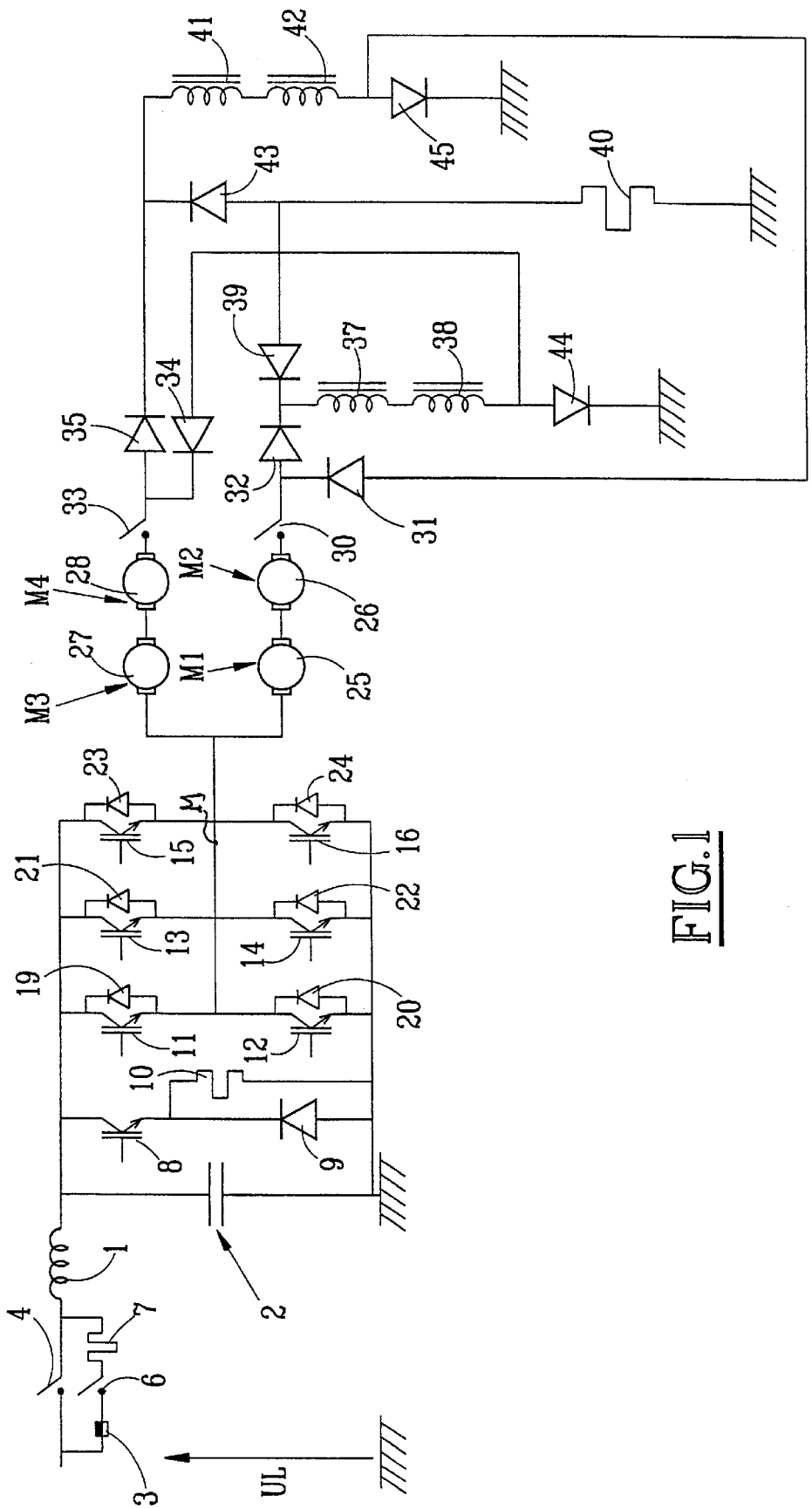
FIG. 1 is an electrical diagram of a power supply device for series-excitation electric motors of the type with a bidirectional current chopper according to the invention.

The power supply device represented in FIG. 1 includes an inductor 1 connected in series with a capacitor 2 to the terminals of a DC voltage supply source UL via a parallel circuit 3 comprising a circuit breaker 4 to the terminals of which a fuse 5, a protective switch 6 and a resistor 7 are connected in series.

An insulated-gate bipolar transistor or IGBT switch 8 and a diode 9 linked to the emitter-collector path of the IGBT switch 8 are connected in series across the terminals of the capacitor 2.

A rheostat 10 is connected in parallel with the diode 9.

Three groups of two IGBT switches 11, 12, 13, 14, 15 and 16 are furthermore connected in parallel to the terminals of the capacitor 2, the collector-emitter paths of the transistors of each group being connected in series.

Diodes 19, 20, 21, 22, 23, 24 respectively are connected in parallel with the emitter-collector paths of the IGBT transistors, the cathodes of the said diodes being connected to the collectors of the associated transistors.

The junction points between the emitters of the switches 19, 21, 23 and the collectors of the switches 20, 22, 24 form the midpoint of the chopper and are connected together to first terminals of two rotors 25, 27 of first and third electric motors M1, M3.

The rotors 25, 27 are each connected in series with a respective rotor 26, 28 of second and fourth electric motors M2, M4. The circuit consisting of the switches 11, 13, 15 and their associated diodes 19, 21, 23 and of the switches 12, 14, 16 and their associated diodes 20, 22, 24, the switches 11, 13, 15 and 12, 14, 16 having common terminals connected to the rotors 25, 26 and 27, 28 of the electric motors M1 to M4 form a chopper with midpoint M for supplying the said motors.

Depending on the power demanded from the chopper, it may include only two or one IGBT switch connected on each side of the midpoint M.

The terminal of the rotor 26 of the motor M2 opposite the rotor 25 of the motor M1 is connected via an isolating contactor 30 to the cathode of a diode 31 and to the anode of a diode 32.

Likewise, the terminal of the rotor 28 of the motor M4 opposite the rotor 27 of the motor M3 is connected via an isolating contactor 33 to the cathode of a diode 34 and to the anode of a diode 35.

The cathode of the diode 32 is connected, on the one hand, to the field coils 37, 38 of the motors M1, M2 linked in series and, on the other hand, to the cathode of a diode 39 linked by its anode to a resistor 40 for limiting the fault current in braking mode.

The cathode of the diode 35 is connected, on the one hand, to the field coils 41, 42 of the motors M3, M4 linked in series and, on the other hand, to the cathode of a diode 43 linked by its anode to the resistor 40 for limiting the fault current in braking mode.

The terminal of the field coil 38 of the motor M2 opposite the field coil 37 of the motor M1 is connected to the anode of a diode 44 the cathode of which is linked to earth as well as to the anode of the diode 34 the cathode of which is linked to the isolating contactor 33 of the rotors 27 and 28 of the motors M3 and M4.

The terminal of the field coil 42 of the motor M4 opposite the field coil 44 of the motor M3 is connected to the anode of a diode 45 the cathode of which is linked to earth as well as to the anode of the diode 31 linked by its cathode to the isolating contactor 30 of the rotors 25 and 26 of the motors M1 and M2.

Hence it will be seen that the diodes 32 and 44 linking the rotors 25, 26 of the motors M1, M2 to their field coils 37, 38 and the diodes 35 and 45 linking the rotors 27, 28 of the motors M3, M4 to their field coils 41, 42, these diodes being biased in a first direction, provide for the motors to operate in traction mode when the IGBT switches 11, 13, 15 are conducting and the IGBT switches 12, 14, 16 are turned off.

Moreover, the diodes 31 and 43 linking the rotors 25 and 26 of the motors M1, M2 to the field coils 41, 42 of the motors M3, M4 and the diodes 34 and 39 linking the rotors 27, 28 of the motors M3, M4 to the field coils 37, 38 of the motors M1, M2 and to the limiting resistor 40, these diodes being biased in a direction opposite to the direction of bias of the diodes 32, 44, 35, 45, provide for the motors to operate in braking mode when the IGBT switches 12, 14, 16 are conducting and the IGBT switches 11, 13, 15 are turned off.

The operation of the bidirectional chopper described with reference to FIG. 1 will be described with reference to FIGS. 2 and 3 in which only the components playing a part respectively in the operation in traction and in braking mode are represented.

The IGBT switches 11, 13, 15 are set into traction mode. The duty cycle of the conduction of these switches varies between 0 and 1.

The IGBT switches 12, 14, 16 are set into braking mode. The duty cycle of the conduction of these switches varies between 0 and 1.

The motors M1, M2, M3, M4 are connected in series-parallel and are assumed to equip the two-motor bogies, in pairs, with a power car of an urban or suburban vehicle.

In the case of the use of single-motor bogies, the diagram would include two motors switched over in parallel. It will also be noted that the invention also applies to the supply to a single motor.

Depending on the controlled IGBT switches 11, 13, 15 or 12, 14, 16, the motors are connected naturally in traction or in braking mode by virtue of the diodes 32, 44, 35, 45 and 31, 34, 43, 39 respectively.

Figure 2:
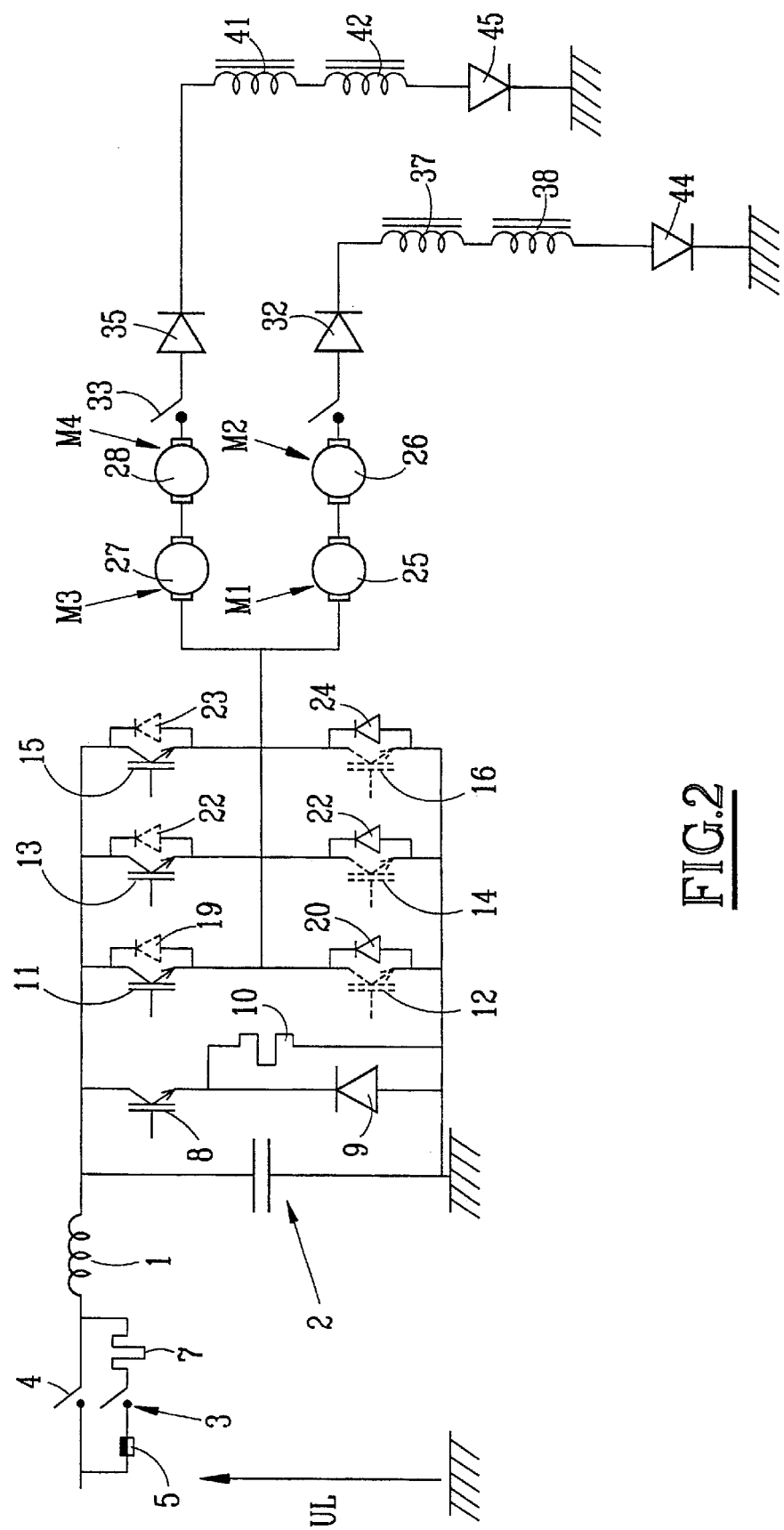
FIG. 2 is an electrical diagram of the power supply device of FIG. 1 operating in traction mode.

When the chopper is operating in traction mode, its diagram is that of FIG. 2.

The IGBT switches 11, 13 and 15 are turned on while the IGBT switches 12, 14, 16 are turned off as FIG. 2 shows, in which the switches 12, 14, 16 are represented by broken lines.

The diodes 20, 22, 24 connected to the terminals of the emitter-collector paths of the switches 12, 14, 16 perform the function of freewheel diodes. The diodes 19, 21, 23 associated with the conducting switches 11, 13, 15 play no part and, that being so, are represented by dotted lines.

The chopper thus configured supplies power to the traction motors M1 to M4.

The rotors 25, 26 of the motors M1, M2 are connected naturally in series with their field coils 37, 38 by means of the diodes 32 and 44.

The rotors 27, 28 of the motors M3, M4 are connected naturally in series with their field coils 41, 42 by means of the diodes 35, 45.

Figure 3:
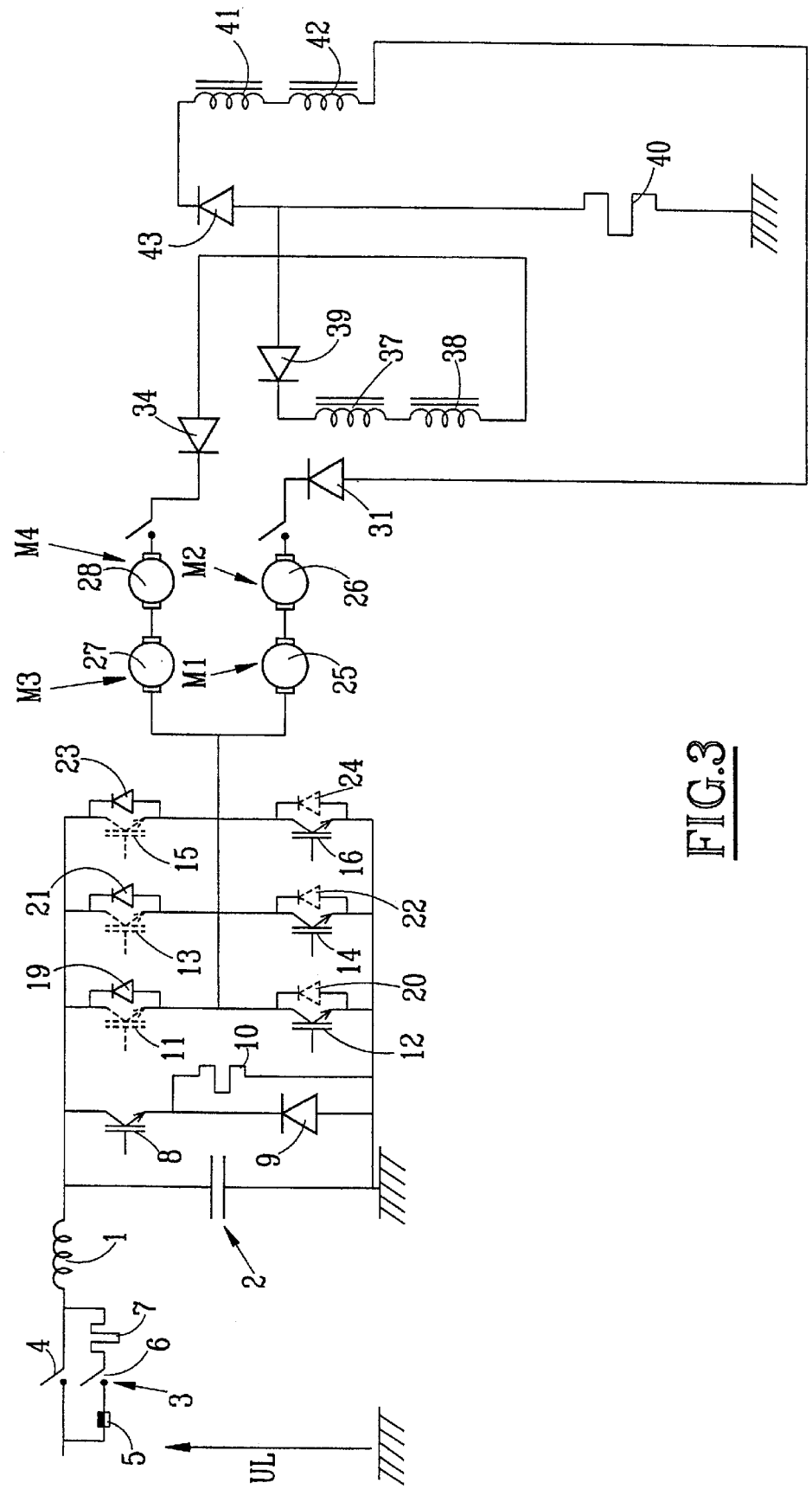
FIG. 3 is an electrical diagram of the power supply device of FIG. 1 operating in braking mode.

When the chopper is operating in braking mode, its diagram is that of FIG. 3.

The IGBT switches 12, 14, 16 are turned on and the turned-off diodes 19, 21, 23 associated with the switches 11, 13, 15, represented in discontinuous line, perform the function of freewheel diodes.

The diodes 20, 22, 24 associated with the switches 12, 14, 16 are inoperative and, that being so, are represented by dotted lines.

The chopper thus configured supplies power to the traction motors M1 to M4 in order to make them operate in generator mode. The rotors 25, 26 of the motors M1, M2 are connected naturally in series with the field coils 41, 42 of the motors M3, M4 by means of the diodes 31, 43 and with the resistor 40 for limiting fault current in braking mode which acts as a load for the motors operating in generator mode.

The rotors 27, 28 of the motors M3, M4 are connected naturally in series with the field coils 37, 38 of the motors M1, M2 by means of the diodes 34, 39 and with the resistor 40 for limiting fault current in braking mode.

The crossover of the field coils with respect to the rotors of the motors M1, M2 and M3, M4 is made necessary in order to ensure the stability of the operation in braking mode by the branches of the motors connected in parallel.

The isolating contactors 30, 33 are always closed whatever the operating mode in traction or in braking, as well as during the transitions between these two modes.

The role of these contactors is to monitor the fault current in braking mode in combination with the resistor 40 for limiting the fault current in braking mode.

These contactors also isolate the rotors from the field coils of the motors M1 to M4, in the event of the power car equipped with such a system being placed out of service and of its being towed.

The configuration which has just been described allows switching over from the traction mode to the braking mode of series-excitation motors which is entirely static and natural.

It is sufficient to switch over the power supply chopper either into traction mode or into braking mode.

Moreover, the chopper according to the invention offers a certain number of advantages.

In the field of the renovation of traction equipment, it extracts optimal advantage from the characteristics of series-excitation motors.

From an industrial point of view, the main advantage of the current-chopper device according to the invention is to allow the reuse in an identical way of power trains of standard MLI inverters to implement the current-chopper function.

To that end, the three output phases are short-circuited and the three switches 11, 13, 15 are driven into traction mode and the three switches 12, 14, 16 into braking mode, and the diode-type traction-braking changeover-switching device is combined with the traction and braking switches.

Finally, the bidirectional current-chopper power supply device according to the invention includes a single resistor 40 for limiting the fault current in braking mode for the two groups of electric motors M1, M2 and M3, M4.

This resistor is switched over naturally in the braking circuit by the diodes 39 and 43.

What is claimed is:

1. A device for supplying electric current to at least one series-excitation motor comprising: a chopper having a midpoint (M) linked to a rotor of said motor; at least one first controlled static switch connected to said midpoint and which is additionally connected to a voltage source for applying a supply current to the electric motor in traction mode; at least one second controlled static switch, additionally linked to a ground, for closing a circuit for linking with a load for the motor operating in generator mode during braking; and reverse-biased diode-type changeover-switching means for respectively allowing the supply current of the motor delivered by the first controlled static switch to pass in a first direction while the latter is conducting, and for allowing the current delivered to the circuit for linking with the load by the motor operating in generator mode to pass in a second direction through said second controlled static switch when the latter is conducting.

2. The power supply device according to claim 1, wherein said first and second controlled static switches are switches formed by insulated-gate bipolar transistors, IGTs.

3. The power supply device according to claim 1, wherein the midpoint (M) of the chopper is connected to at least one series-excitation motor mounted in a first branch, including a rotor, a field coil of said motor and the associated diode-type changeover-switching means and wherein the midpoint is connected to at least one series-excitation motor mounted in a second branch connected in parallel with the first branch and comprising a rotor, a field coil of said motor and the associated diode-type changeover-switching means, the load for said motors operating in generator mode being common to the first and to the second branches.

4. The power supply device according to claim 1, wherein the diode-type changeover-switching means biased in a first direction comprise: a first diode connected between the rotor and the associated field coil of the motor and a second diode connected between the field coil and the ground, said first and second diodes being biased to conduct the supply current of said motor delivered by said first controlled static switch when it is conducting, the second controlled static switch being turned off.

5. The power supply device according to claim 4, wherein the changeover-switching means with diodes biased in a second direction comprise: a third diode connected between the rotor and the associated field coil and a fourth diode interposed between the field coil and the load said third and fourth diodes being biased to conduct the braking current delivered by the motor operating in generator mode when the second controlled static switch is conducting, the first controlled static switch being turned off.

6. The power supply device according to claim 3, wherein the changeover-switching means with diodes biased in a second direction comprise: a third diode connected between the rotor of the motor arranged in said first branch and the field coil of the motor arranged in said second branch; and a fourth diode interposed between the field coil and the load said third and fourth diodes being biased to conduct the braking current delivered by the motor operating in generator mode when the second controlled static switch is conducting, the first controlled static switch being turned off.

7. The power supply device according to claim 1, wherein the chopper includes, several first controlled static switches connected to its midpoint for applying the power supply current to said at least one electric motor in traction mode, and the same number of second controlled static switches for closing the circuit for linking with the load for the motor operating in generator mode during braking.

* * * * *